US005724732A

United States Patent [19]

Arnold et al.

[11] Patent Number: 5,724,732

[45] Date of Patent: Mar. 10, 1998

[54] METHOD AND APPARATUS FOR SUPPORTING PUSH RODS

[75] Inventors: Tracy A. Arnold, East Peoria; Robert L. Davis; Edward J. Gunnar, both of Peoria, all of Ill.

[73] Assignee: Caterpillar Inc., Peoria, Ill.

[21] Appl. No.: 748,741

[22] Filed: Nov. 18, 1996

[51] Int. Cl.[6] .................... B23P 19/04

[52] U.S. Cl. .................... 29/888.01; 29/214; 29/559; 211/60.1

[58] Field of Search .................... 29/888.01, 888.011, 29/888.2, 214, 466–468, 559; 211/60.1

[56] References Cited

U.S. PATENT DOCUMENTS

| | | | |
|---|---|---|---|
| 622,864 | 4/1899 | Rauch . | |
| 955,646 | 4/1910 | Jorey . | |
| 1,673,943 | 6/1928 | Herr | 29/888.01 |
| 1,701,783 | 2/1929 | Law . | |
| 1,765,496 | 6/1930 | Miller . | |
| 1,879,024 | 9/1932 | Barto, Jr. | 29/214 |
| 2,039,497 | 5/1936 | Simons | 211/65 |
| 2,556,061 | 9/1951 | Tapken | 29/214 |
| 2,833,419 | 5/1958 | Trumpy | 211/60 |
| 3,086,507 | 4/1963 | Mooney, Jr. | 123/90 |
| 3,742,579 | 7/1973 | Oftedahl | 29/214 |
| 4,847,991 | 7/1989 | Highuchi | 29/559 |
| 4,856,467 | 8/1989 | Kronich | 123/90.43 |
| 4,912,825 | 4/1990 | Policella | 29/214 |
| 4,966,288 | 10/1990 | Kirkham | 211/60.1 |
| 5,044,329 | 9/1991 | Jamora | 123/90.61 |
| 5,303,467 | 4/1994 | Narita et al. | 29/888.01 |

FOREIGN PATENT DOCUMENTS

| | | | |
|---|---|---|---|
| 781007 | 11/1980 | U.S.S.R. | 29/888.01 |
| 1436171 | 5/1976 | United Kingdom | 29/214 |

*Primary Examiner*—Erick R. Solis
*Attorney, Agent, or Firm*—Alan J. Hickman

[57] ABSTRACT

A bracket having a plurality of notches is temporarily connected to a structural member of an internal combustion engine to support a plurality of push rods at a preselected location and orientation during assembly of a rocker arm assembly on a cylinder head. The bracket is slidably positionable on the structural member and the notches are configured in a manner to releasably support the push rods.

16 Claims, 2 Drawing Sheets

METHOD AND APPARATUS FOR SUPPORTING PUSH RODS

TECHNICAL FIELD

A method and apparatus is provided for supporting a plurality of push rods at a preselected location and orientation during installation of a rocker arm assembly on a cylinder head of an internal combustion engine.

BACKGROUND ART

Push rods used to forcibly pivotally move rocker arms associated with intake valves, exhaust valves and fuel injectors of an internal combustion engine are well known in the art. Such push rods are normally positioned within the engine between a camshaft and the rocker arms and translate rotary camshaft motion to linear motion to force pivotal motion of the rocker arms. The push rods are normally engaged at one end with a cam follower which rides against the cam shaft and engaged at the other end against the rocker arms. The push rods are retained in position between the cam shaft and rocker arms by way of the seating engagement with the cam follower and the rocker arms, as well known in the art.

Since the push rods are free from being guided or supported within the engine by either the cylinder head or cylinder block, removal of the rocker arms causes the push rods to be released to move to an arbitrary location and orientation. The force of gravity normally keeps the one end of the push in contact with the cam follower. The push rod normally, but not necessarily, pivots about the seat provided on the lifter to the arbitrary location and orientation. This arbitrary location and orientation is not controlled and may vary from push rod to push rod. This causes an alignment problem between the push rods and the rocker arms during subsequent mounting of the rocker arms on the cylinder head.

In many engines rocker arm assemblies having a plurality of rocker arms pivotally connected to a stand are mounted on the engine head as a unit. Such an assembly is usually connected by a plurality of bolts to the engine head. In such applications the random position of the plurality of push rods to be seated with the rocker arms and cam followers makes assembly difficult. Holding and aligning a plurality of push rods with a plurality of rocker arms while maintaining the push rods in seating engagement with the cam followers is time consuming and extremely difficult.

Providing a permanent push rod guide for the plurality of push rods on the engine is not a viable solution as the non-linear motion of the push rods during operation of the engine causes wear of the permanent guide and push rods. This wear results in premature failure and down time of the engine.

Often there are a plurality of rocker arm assemblies, one for each engine cylinder, provided on a cylinder head. Typically, each of the plurality of rocker arm assemblies are identical in construction and have common dimensions. Providing an apparatus for holding the push rods of each of the plurality of assemblies simultaneously would be bulky, complicated and expensive.

The present invention is directed to solving one or more of the problems as set forth above.

DISCLOSURE OF THE INVENTION

An apparatus for supporting a plurality of spaced push rods in place during installation of a rocker arm assembly on a cylinder head of an internal combustion engine includes a bracket having first and second spaced end portions removably connected to a structural member of the engine. The bracket includes an intermediate portion having a plurality of push rod receiving notches. The notches are spaced a preselected distance apart to receive an maintain each of the push rods at a preselected location and orientation relative to the cylinder head.

A method for supporting a plurality of push rods at a predetermined location and orientation during installation of a rocker arm assembly on a cylinder head of an internal combustion engine comprises the steps of: connecting a bracket having a plurality of spaced apart notches disposed therein to a structural member of the engine; positioning the bracket at a preselected location relative to the cylinder head at which the plurality of notches are aligned to receive a plurality of push rods; moving one of the plurality of push rods and bracket towards each other and placing the push rods in a respectively adjacent one of the plurality of notches; engaging each of a plurality of rocker arms of the rocker arm assembly with a respectively adjacent one of the plurality of push rods; and fastening the rocker arm assembly to the cylinder head.

BEST MODE FOR CARRYING OUT THE INVENTION

Figure 1:
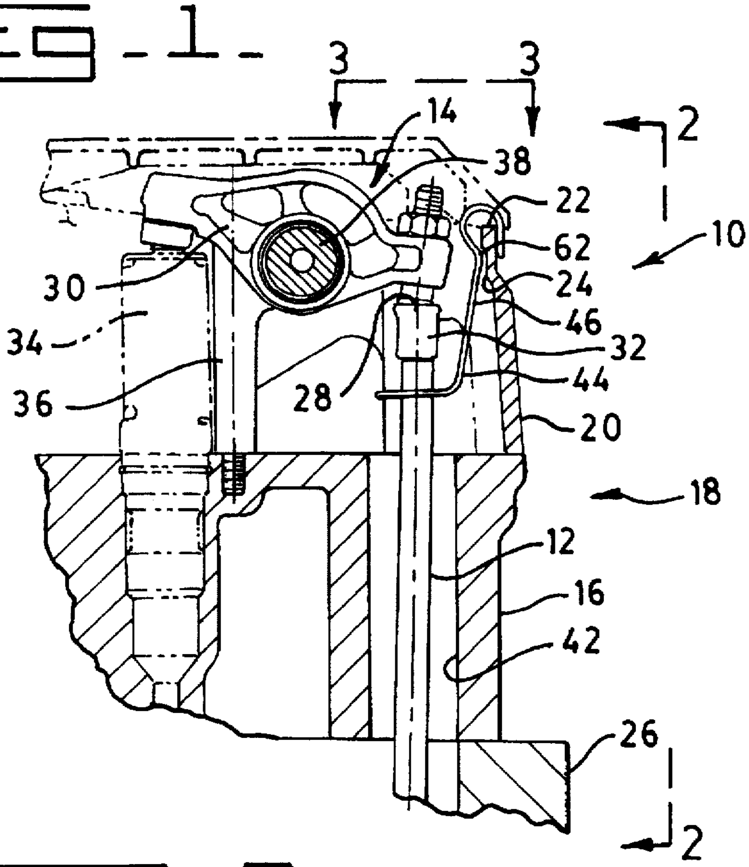
FIG. 1 is a diagrammatic cross sectional view of an embodiment of the present invention showing a portion of an internal combustion engine, a plurality of push rods, a rocker arm assembly and a bracket positioned to support the plurality of push rods.
Figure 2:
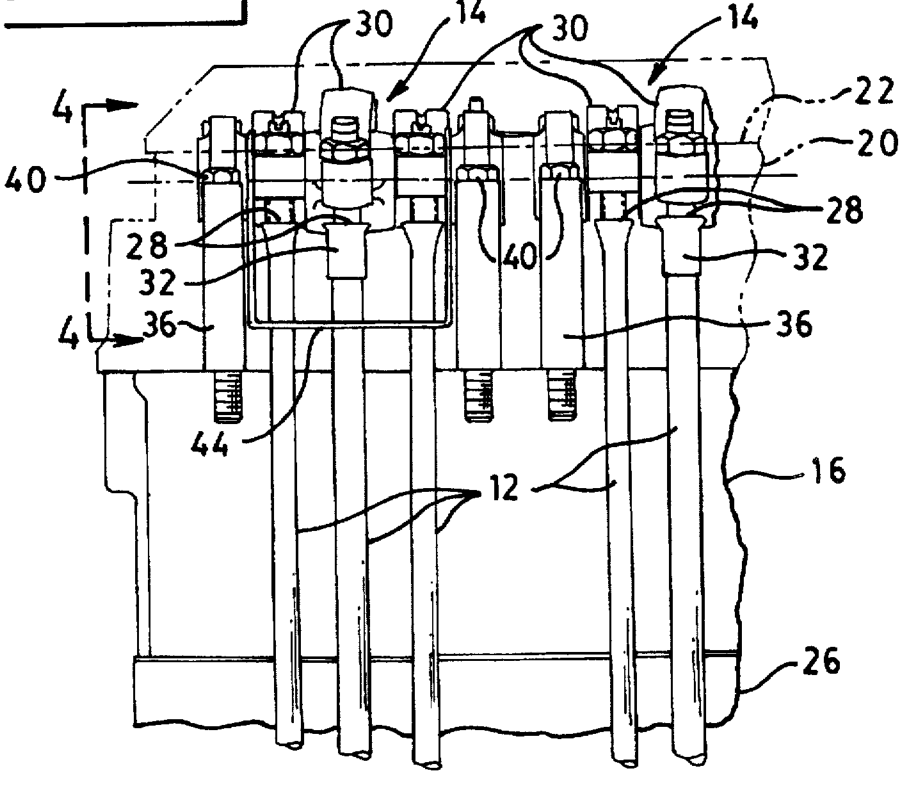
FIG. 2 is a diagrammatic view taken along lines 2—2 of FIG. 1.

With reference to the drawings and particularly FIGS. 1 and 2, an apparatus 10 for supporting a plurality of spaced push rods 12 in place during installation of a rocker arm assembly 14 on a cylinder head 16 of an internal combustion engine 18 is shown. A structural member 20, for example an intake manifold, is located at a preselected location relative to said cylinder head 16. In particular; the structural member 20 is located adjacent the intake manifold and has an elongate flange 22 extending substantially parallel to the direction of elongation of the cylinder head 16 The structural member also has a side 24 which faces the push rods 12.

The engine has an engine block 26, a cam shaft and a plurality of roller cam followers (not shown). The push rods 12 are seated at one end thereof against the cam followers and at the other end 28 thereof against a plurality of rocker arms 30 of the rocker arm assembly 14. The end 28 may include a seat member 32 connected to the push rods 12. The push rods 12 are held in position between the cam followers and the rocker arms 30 in a conventional manner such as by way of compression springs (not shown). The compression springs are typically associated with intake and exhaust valves and unit fuel injectors 34. The rocker arms 30 are engageable with the intake valves, the exhaust valves and the fuel injectors 34 in a conventional manner. Camshaft driven movement of the push rods is transferred to the intake, exhaust valves and the fuel injectors 34 by way of the pivotally movable rocker arms.

The rocker arms 30 are pivotally connected to a stand 36 by a shaft 38. The stand 36 is removably secured to the cylinder head 16 by way of a plurality of threaded fasteners 40. The location of the stand 36 on the cylinder head is such that the rocker arms 30 are aligned with the intake and exhaust valves, the fuel injector 34 and appropriate ones of the push rods 12. As can be seen in FIG. 2, there is provided on the engine 18 at least one intake, one exhaust valve, and one fuel injector 34 for each of the engine cylinders. A rocker arm assembly 14 and a plurality of push rods 12 (three shown) is provided for each of the engine cylinders.

An elongate opening 42 is provided in the cylinder head 16 that allows the push rods 12 to extend between the cam follower and the rocker arm 30. Since the push rods 12 are not guided or supported by the cylinder head 16 or the engine block 26, in the absence of the rocker arm assembly 14 the push rods 12 are loose and free to move within the opening.

Figure 3:
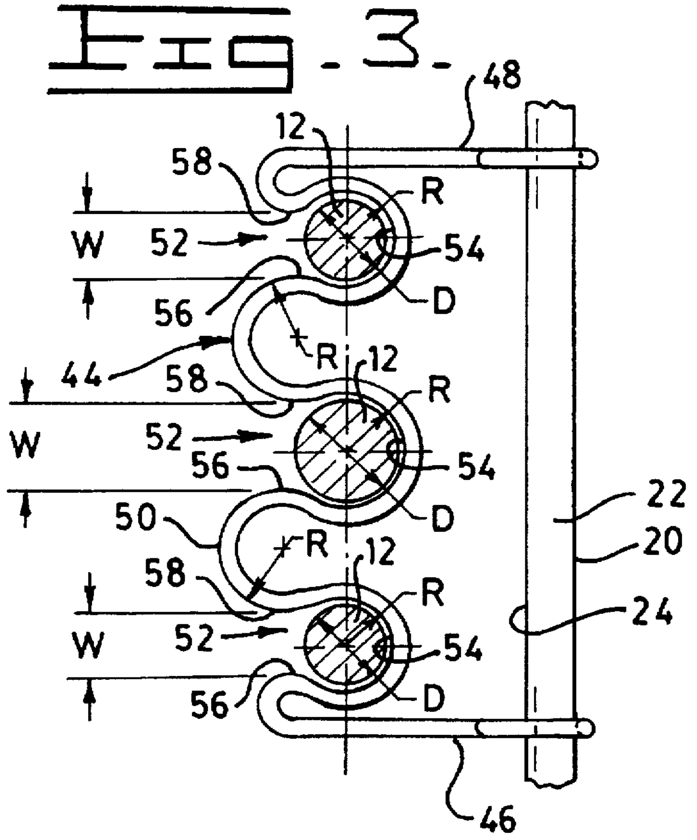
FIG. 3, is a diagrammatic view taken along lines 3—3 of FIG. 1 showing the bracket in greater detail.
Figure 4:
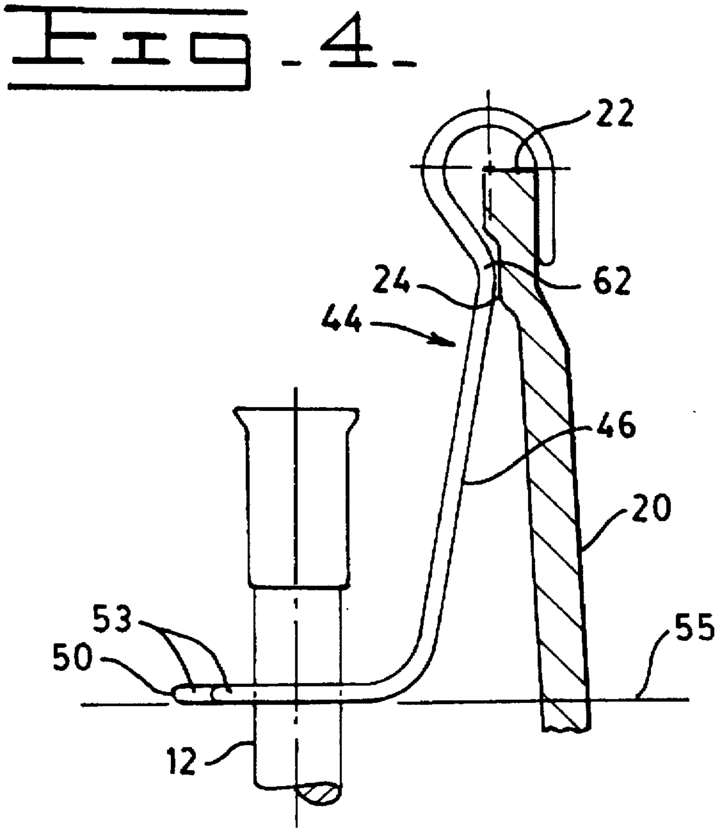
FIG. 4 is a diagrammatic view taken along lines 4—4 of FIG. 2.

As best seen in FIGS. 3 and 4, a bracket 44 has first and second spaced end portions 46,48 and an intermediate portion 50 with a plurality of push rod receiving notches 52. The bracket 44 is removably connected at the first and second spaced end portions 46,48 to the structural member 20 of the engine 18. The notches 52 are spaced a preselected distance apart to receive and maintain each of the push rods 12 at a preselected location and orientation relative to the cylinder head 16.

The first and second end portions 46,48 have a hook like configuration and are hookingly connected to and longitudinally adjustably movable along the flange 22 to a location at which the notches 52 are positioned to maintain the push rods 12 at the preselected location and orientation relative to the cylinder head 16.

The notches 52 open in a direction toward the push rods 12 and the first and second end portions 46,48 of the bracket 44 extend generally in an opposite direction so as to be connectable to the elongate flange 22. As best seen in FIG. 1, the intermediate portion 50 extends transverse the normal direction of extension of the push rods 12 and in a direction transverse the structural member 20. The bracket 44 is flexible and movably opens to receive the push rods 12 in the notches 52.

As best seen in FIG. 3, the first and second end portions 46,48 and the intermediate portion are preferably constructed from a continuous spring steel wire material of any suitable construction. A plurality of sinuously wound wire loops 53 define the spaced apart notches 52 of the intermediate portion 50. The loops 53 preferably lie in a common plane 55 which is oriented transverse the normal direction of extension of the push rods 12.

The notches 52 each have a root portion 54 and first and second crown portions 56,58 extending from the root portion 54. The first and second crown portions 56,58 and the root portion 54 are each defined by a radius "R" (may differ in magnitude). The first and second crown portions 56,58 are spaced apart a preselected distance "W" smaller in magnitude than a preselected diameter "D" of the push rod being supported in the notch and define an opening therebetween for the notches 52. In particular, the diameter "D" of the push rod 12 used to actuate the fuel injector 34 is larger in magnitude than the diameter of the push rod 12 used to actuate the intake and exhaust valves. Also, the radius "R" of the root portion 54 is proportioned relative to the diameter "D" of the push rod 12 being supported therein. As shown in the drawings the diameter "D" of the push rod 12 is slightly smaller in magnitude than twice the radius "R" of the root. Should it be desired to hold the push rod from both axial as well as radial motion the diameter "D" of the push rod will be slightly larger than twice the radius "R" of the root portion 54.

As best seen in FIGS. 1 and 4, the side portion 24 of the structural member 20 is open to the push rods 12. The first and second end portions 46,48 are engaged with the side portion 24. This engagement maintains the first and second end portions 46,48 from pivotal movement and maintains the plane 55 transverse to the push rods 12. In particular the first and second end portions 46,48 each have a bend 62 at a location of termination of the hook like configuration. The first and second end portions 46,48 engage the side portion 24 at the bends 62.

It should be recognized that although the wire constructed bracket 44 is the preferred embodiment, other bracket 44 configurations having notches 52 for temporarily supporting a plurality of push rods 12 at a preselected position are equivalents and within the scope of this invention.

INDUSTRIAL APPLICABILITY

With reference to the drawings, the method for supporting a plurality of push rods 12 at a predetermined location and orientation during installation of a rocker arm assembly 14 on the cylinder head 16 of the internal combustion engine is achieved by way of the bracket 44 of apparatus 10.

The technician simply connects the bracket 44 to the structural member by hooking the first and second end portions 46,48 over the elongate flange 22 of the structural member 20 and engaging the first and second end portions 46,48 with the side portion 24. The bracket 44 is then positioned at a preselected location relative to the cylinder head at which the plurality of notches are aligned to receive the push rods 12 by simply sliding the bracket 44 along the elongate flange 20 to the desired position. The push rods 12 and bracket 44 are then relatively moved towards each other (by moving either one or both of the bracket 44 or push rods 12) and the push rods 12 are placed in a respectively adjacent one of the plurality of notches 52. The rocker arm assembly 14 is then appropriately positioned on the cylinder head 16 and each of the plurality of rocker arms 30 of the rocker arm assembly 14 are engaged with a respectively adjacent one of the plurality of push rods 12. The rocker arm assembly 14 is then fastened to the cylinder head by the plurality of threaded fasteners.

Because the distance "W" between the first and second crown portions 56, 58 of the notches 52 is smaller in magnitude than the diameter "D" of the push rods 12 to be disposed therein the technician forces the plurality of push rods 12 into engagement with the bracket 44 at the opening of said notches 52. Spreading of the bracket 44 at the opening of the notches 52 is achieved by the forcing of the push rod against the first and second crown portions 56,58 which causes the spring steel to flex and open the notches 52. Subsequent moving of the push rods 12 into the notches 52 and into the root portion 54 is achieved with reduced force once the push rod passes the narrowest space "W" between the crown portions 56,58. Inadvertent movement from the root portion 54 of the notch 52 is prevented as the force require to pass the first and second crown portions 56,58 is substantial. It should be noted that the forcing of the push rods 12 into engagement with the bracket 44 and into the notches 52 may be achieved by pivoting either the push rods 12 about their seated connection with the cam followers toward the bracket 44 or by pivoting the bracket 44 about the first and second end portions 46,48 toward the push rods 12.

Removal of the bracket 44 from supporting connection with the push rods 12 is performed subsequent to assembly of the rocker arm assembly 14 on the cylinder head 16. This is achieved by simply forcing the bracket 44 to release the push rods 12 from being retained in the notches 52 and removing the bracket 44 from connection with the structural member 20.

In engines 18 where a plurality of rocker arm assemblies 14 are utilized, one simply performs the steps identified above for each of the cylinders of the engine 18. Since the bracket 44 used for supporting the push rods 12 associated with one of the rocker arm assemblies 14 is also suitable for supporting the push rods 12 associated with the other rocker arm assemblies 14 only a single bracket 44 is required. The ability to use a common bracket 44 is facilitated by the first and second end portions 46,48 being hookingly and slidably connected to the structural member 20 and the construction of the intermediate portion 50 as described above.

Other aspects, objects and advantages of the present invention can be obtained from a study of the drawings, the disclosure and the appended claims.

We claim:

1. An apparatus for supporting a plurality of spaced push rods in place during installation of a rocker arm assembly on a cylinder head of an internal combustion engine, comprising:

a structural member located at a preselected location relative to said cylinder head; and a bracket having first and second spaced end portions and an intermediate portion having a plurality of push rod receiving notches, said first and second spaced end portions being removably connected to the structural member of the engine and said notches being spaced a preselected distance apart to receive and maintain each of the push rods at a preselected location and orientation relative to the cylinder head.

2. An apparatus, as set forth in claim 1, wherein said structural member has an elongate flange and said first and second spaced end portions having a hook like configuration, said first and second end portions being hookingly connected to and adjustably movable along the flange to a location at which said notches are positioned to maintain the push rods at said preselected location and orientation relative to the cylinder head.

3. An apparatus, as set forth in claim 2, wherein said intermediate portion being flexible and movably opening to receive the push rods in said notches.

4. An apparatus, as set forth in claim 3, wherein said notches opening in a direction toward said push rods and said first and second end portions extending in a direction opposite the direction of opening of said notches.

5. An apparatus, as set forth in claim 3, wherein said notches each have a root portion and a first and a second crown portions extending from said root portion, said first and second crown portions and said root portion each being defined by a radius, said first and second crown portions being spaced apart a preselected distance smaller in magnitude than a preselected diameter of the push rod being supported in each of said notches.

6. An apparatus, as set forth in claim 5, wherein said first and second end portions and said intermediate portions are constructed from one of a square and cylindrical wire material.

7. An apparatus, as set forth in claim 3, wherein said intermediate portion includes a plurality of sinuously wound wire loops defining said spaced apart notches.

8. An apparatus, as set forth in claim 7, wherein said wire loops each have a root portion and a first and a second crown portions extending from said root portion, said first and second crown portions and said root portion each being defined by a radius, said first and second crown portions being spaced apart a preselected distance smaller in magnitude than a preselected diameter of the push rod being supported in each of said notches.

9. An apparatus, as set forth in claim 8, wherein said loops lie along a common plane extending transverse the push rods.

10. An apparatus, as set forth in claim 9, wherein said notches opening in a direction toward said push rods and said first and second end portions extending in a direction opposite the direction of opening of said notches.

11. An apparatus, as set forth in claim 2, wherein said structural member has a side portion and said first and second end portions being engaged with and held from pivotal movement by the side portion.

12. A method for supporting a plurality of push rods at a predetermined location and orientation during installation of a rocker arm assembly on a cylinder head of an internal combustion engine, comprising the steps of:

connecting a bracket having a plurality of spaced apart notches disposed therein to a structural member of the engine;

positioning the bracket at a preselected location relative to the cylinder head at which the plurality of notches are aligned to receive a plurality of push rods;

moving one of the plurality of push rods and bracket towards each other and placing the push rods in a respectively adjacent to one of the plurality of notches;

engaging each of a plurality of rocker arms of the rocker arm assembly with a respectively adjacent one of the plurality of push rods; and fastening the rocker arm assembly to the cylinder head.

13. A method, as set forth in claim 12, wherein the step of moving one of the plurality of push rods and bracket towards each other and placing the push rods in a respectively adjacent one of the plurality of notches includes the steps of:

forcing the plurality of push rods into engagement with the bracket;

spreading the bracket at a location of an opening of said notches; and moving said push rods into the notches.

14. A method, as set forth in claim 13, wherein said step of forcing the plurality of push rods into engagement with the bracket includes the step of pivoting one of the plurality of push rods and bracket toward each other.

15. A method, as set forth in claim 12, including the step of removing said bracket from connection with said structural member and from having said push rods disposed in the notches.

16. A method, as set forth in claim 12, wherein said step of connecting the bracket to a structural member of the engine includes the step of hooking a first and second end portion of said bracket on the structural member and engaging the first and second end portions with a side portion of the structural member.

* * * * *